Patented Sept. 23, 1947

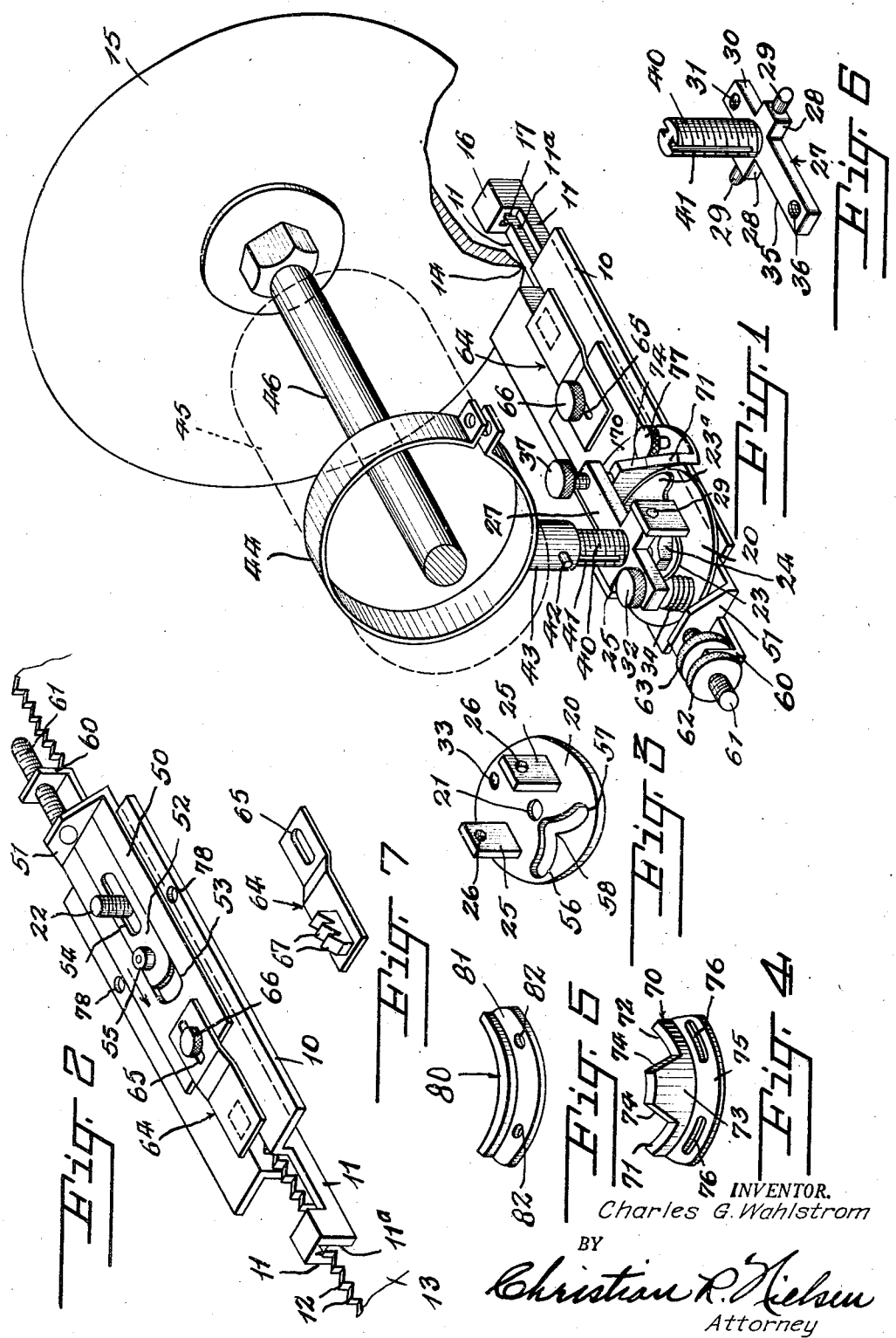

2,427,754

UNITED STATES PATENT OFFICE 2,427,754

SAW SHARPENER

Charles G. Wahlstrom, Redwood City, Calif.

Application July 9, 1946, Serial No. 682,357

5 Claims. (Cl. 76—77)

1

This invention relates to saw sharpeners. An object of the invention is the provision of a sharpener for saws in which a circular grinding wheel is oscillatably mounted on a slider for swinging the wheel into the teeth of the saw, means being provided for cooperation with the teeth of the saw for predetermining the position of the wheel longitudinally of the saw teeth so that a progressive grinding of the teeth may be accomplished.

Another object of the invention is the provision of a sharpener for saws in which a base plate is slidably mounted on the teeth of the saw for carrying an oscillatable mounting for a grinding wheel, cam slots in the mounting cooperating with a roller on a slide carried by the base plate causing the wheel to move through definite paths at opposite sides of the saw teeth to produce the proper angular cuts on the teeth with means engaging the saw teeth for determining the progressive advancement of the wheel along the teeth.

A further object of the invention is the provision of a sharpener for saws in which a base plate having a groove for receiving frictionally the teeth of a saw for grinding the base plate longitudinally of said saw, a grinding wheel having an oscillatable support including a rockable bar supported by a spring at an end and a set screw riding on a flange that is connected to a disk rotatable on the base plate, cam grooves in the disk cooperating with a roller for actuating a slide carrying teeth which engage the teeth of the saw so that when the grinding wheel is oscillated either toward the right or left from a vertical plane passing through the saw blade, the teeth carried by the slide will move into the next tooth of the saw for advancing the base plate and for placing the grinding wheel in the proper position to grind the next tooth on the saw.

This invention consists in the novel construction, arrangement and combinations of parts hereinafter more particularly described and claimed.

In the drawings:

Figure 1 is a view in perspective of a saw sharpener constructed according to the principles of my invention.

Figure 2 is a view in perspective of a guided base plate for the sharpener with the operating motor and other accessories removed.

Figure 3 is a view in perspective of a disk having cam grooves to direct the oscillating movement of the grinding wheel.

Figure 4 is a view in perspective of a flange

2 for predetermining the cutting position of the grinding wheel when cross cut saw is sharpened.

Figure 5 is a view in perspective of a flange for predetermining the cutting position of the grinding wheel when rip saws are sharpened.

Figure 6 is a view in perspective of a support for a motor or flexible shaft which operates the grinding wheel, and Figure 7 is a view in perspective of the underface of a spring clip having teeth which engages the teeth of a saw and which sets the grinding wheel properly for engagement with a succeeding tooth on said saw.

Referring more particularly to the drawings, 10 designates a base plate having a pair of depending flanges 11 to form a channel 11—a in which the teeth 12 of a saw 13 are placed for supporting the plate 10. The flanges extend beyond one end of the plate proper and beyond the cutting edge 14 of a grinding wheel 15. The free end of the extended flanges are joined together by a cross bar 16. It will be noted from Figure 1 as indicated at 17 that the space between the upper edges of said flanges is flared to permit ready sliding of the teeth of the saw without rubbing against the flanges in order to prevent injuring the teeth although the flanges frictionally engage the blade of said saw.

A disk 20 has a central opening 21 which receives a threaded stud 22 secured to the base plate 10. A washer 23 is received by the stud and a nut 24 on said stud secures the disk in place when screwed down on the washer. Brackets 25 having passages 26 are secured in parallel relation on the disk.

A supporting bar 27 has right angularly disposed arms 28 which are provided with pintles 29 received by the passages 26 in the brackets 25. One end 30 of the bar 27 has a passage 31 which receives a headed stud 32 threaded into an opening 33 in the disk 20. A coil spring 34 on said stud supports resiliently the end 30 of the bar 27. The other end 35 of said bar has an opening 36 into which is threaded a bolt 37, for a purpose which will be explained presently.

A screw 40 is secured at one end to the bar 27 midway between the arms 28 and rises perpendicularly to said bar. Vertical grooves 41 are formed in the side walls of the screw to receive a pin or set screw 42 in a collar 43 which carries a clamping ring 44 for holding a motor 45 or a flexible shaft which drives a shaft 46 to which the grinding wheel 15 is attached.

A slide 50 has a dove-tail connection with the base plate 10 (Fig. 2). A lip 51 extends upwardly from one end of the slide. A second slide 52 is mounted in a slot 53 in the slide 50. The slide 52 has a slot 54 which receives the threaded stud 22 to permit limited reciprocating movement of said slide. A roller 55 carried by one end of the slide 52 is received by a pair of arcuately-shaped cam slots 56 and 57 which intersect at 58. The washer 23 has a flange 23—a which extends over the roller 55.

The slide 52 has at its outer end an upstanding lip 60 which is provided with a passage to receive a screw 61 secured to the lip 51 on the slide 50. A nut 62 threaded on said screw bears against the outer face of the lip 60 and when rotated in one direction adjusts the slide 52 inwardly of the slide 50 while a nut 63 on the screw forces the slide 52 outwardly. It will be appreciated that while the nuts 62 and 63 stabilize the position of the slide 52 both nuts must be properly rotated to adjust the slide 52 either inwardly or outwardly of the slide 50.

A spring clip 64 has a slot 65 at one end to receive a set screw 66 threaded into an opening in the inner end of the slide 50. The other end of the spring member 64 at its bottom face has a number of teeth 67 which match the teeth 12 of the saw 13 and which engages the teeth of the saw for a purpose which will be presently explained.

In Figure 4 is shown a track in the form of a curved flange 70 having portions 71 and 72 of uniform height. A raised or cam portion 73 having inclined side edges 74 separates the uniform tracks 71 and 72. The free end of the bolt 37 is adapted to ride on the portions 71, 72 and 73, when a cross-cut saw is sharpened, as will be presently explained. A supporting flange 75 has arcuate slots 76 which receive headed bolts 77 threaded into openings 78 (Figure 2) formed in the base plate 10.

When a rip saw is sharpened the track 80 is employed and the lower free end of the bolt 37 rides on said track when the rotating wheel is oscillated across the teeth of the saw. An attaching flange 81 connected to the track 80 has openings 82 to receive the headed bolts 77.

The operation of my device is as follows: When a cross-cut saw is sharpened, the member 70 is secured to the base plate 10 which has been placed upon the teeth of the saw as shown in Figure 2. Power is applied to the shaft 46 for rotating the wheel 15 and a spring clip 64 having the proper set of holding teeth 67 is applied to the slide 50 by the set screw 66.

It may be stated at this point that approximately eight spring clips must be employed in connection with the sharpener for general work since the spacing between the teeth of saws vary from four to twelve per inch so that the teeth on the clips must be varied accordingly.

During the grinding action of the wheel 15, the motor and shaft 46 are oscillated on the base plate 10 on a vertical pivot by the rocking of the screw 40. The attached bar 27 and the disk 20 on the stud 22 for moving the grinding wheel into operative relation with the teeth of the saw as the grinding wheel is rocked back and forth through an arc across a vertical plane passing through the saw.

When the disk 20 is rocked on the stud 22 in either direction from the plane of the saw, the cam slots 56 and 57 causes the roller 55 to move in the direction of the arrow in Figure 2, thereby pulling the connected slides 50 and 52 in the same direction. This action moves the clip 64 forwardly so that the teeth 67 on the clip will engage the next teeth 12 in succession on the saw. At this time friction between the saw blade and the guide flanges 11 of the base plate holds the plate stationary. However, when the roller 55 rides in one of the cam slots 56 or 57 to the juncture 58 of the slots on the return swing of the grinding wheel toward the vertical plane of the saw the base plate 10 is pulled forwardly, thus setting the wheel in a successive tooth grinding position for the next swing of the wheel because the teeth 67 on the clip 64 holds the slides 50 and 52 stationary after a movement which is limited by the slot 54 which receives the stud 22.

Since the cam slots 56 and 57 are of a predetermined shape, the slides 50 and 52 would move too far for a saw having small teeth and the teeth 67 on the clip 64 would move too far ahead and thus skip one or more teeth. The slot 65 is therefore properly proportioned to meet such an emergency. This slot which is received by the screw 66 permits slide 52 to travel its full path but clip 64 will lag in its forward motion since it can slide independently of the member 52 and is only limited by the length of the slot 65.

When a cross-cut saw is sharpened, the member 70 (Figures 1 and 4) is employed to provide for the grinding of the sides of the teeth. As the shaft 46 and wheel 15 are oscillated, the bar 27 is rocked so that the free end of the bolt 37 will ride on either track 71 or 72 and over the top of the raised portion 73. When the bolt 37 is on the track 71 it will maintain the bar 27 in a horizontal position until said bolt engages the inclined edge 74 of the portion 73 whence it will force the member 70 to move in an arc for a short distance. This movement determines the amount of grinding and also the angle of grinding. The bolt 37 will ride upwardly on the inclined edge 74 until it reaches the top of the member 73 thereby tilting the bar 27 against the tension of the spring 34 for raising the wheel 15 out of contact with the teeth of the saw and over the upper edge of the saw before the wheel is lowered again for the return swing of said wheel.

In Figure 5 is shown a member 80 for sharpening rip saws in which the bolt moves on an uninterrupted path for causing the shaft 46 to swing in a horizontal path so that the grinding wheel will cut across the front of the teeth of the saw.

The tension on the spring 34 is adjusted by the bolt 32 for balancing the wheel and motor while said wheel and motor swings from side to side of the saw blade while permitting tilting of the bar 27 and likewise the wheel 15 when the member 70 is used.

The pin or set screw 42 will maintain the clamp in a predetermined position on the screw 40. However, the release of the set screw will permit of adjustment of the collar 43 on the screw to compensate for wear of the grinding wheel.

The flanges 11 are extended beyond the wheel 15 so that the bridging member 16 will rest on the teeth of the saw for balancing the base plate on the saw.

When the wheel 15 is in grinding position, the distance between the wheel, the roller 55 and the pivot point 22 remains constant. Nevertheless, the proper rotation of the nuts 62 and 63 will cause the slides 50 and 52 to readjust themselves relative to each other so that the teeth 67 on the clip 64 will regulate the position of the machine over the saw.

Although a preferred and practical embodiment of the invention is disclosed herein, it is to be understood that various modications may be made within the scope of the appended claims.

I claim:

1. A saw sharpener comprising a base plate having a channel to receive teeth of a saw and upon which the plate is supported a grinding wheel, a horizontal driven shaft to which the wheel is attached, an oscillatable support for the shaft on the plate so that the wheel may be moved transversely of the saw, a track on the base plate, means on the support and cooperating with the track for guiding the wheel into and out of engagement with the teeth of the saw as said wheel is oscillated, a disk included in the support and provided with intercepting cam slots, a slide on the base plate, a roller on the slide and movable in the slots for moving the slide in opposite directions longitudinally on the base plate and a spring member connected with the slide and having teeth thereon engageable with the teeth on the saw, said slide when moved in one direction causing the teeth attached thereto to engage successive teeth on the saw, movement of the slide in the opposite direction causing the base plate to be drawn along the saw the width of a space between two teeth of the saw when the wheel is oscillated.

2. A saw sharpener comprising a base plate having a channel to receive the cutting edge of a saw, a grinding wheel, a horizontal driven shaft secured to the wheel, an oscillated support for the shaft mounted on the plate so that the wheel may be moved transversely of the saw for grinding the teeth thereof, a disk included in the support and provided with cam slots opening into each other at the inner ends thereof, a slide on the base plate, a roller on the slide and movable in either slot when the support is rocked for moving said slide longitudinally of the base plate and a catch on the slide engageable with the teeth of the saw for causing the base plate to be pulled along the saw the width of a tooth when said slide is moved in one direction, said catch moving idly over the teeth for engagement with a successive tooth on the saw when the slide is moved in the opposite direction by the oscillation of the wheel.

3. A saw sharpener comprising a base plate having a channel to receive the cutting edge of a saw, a grinding wheel, a horizontal driven shaft secured to the wheel, an oscillated support for the shaft mounted on the plate so that the wheel may be moved transversely of the saw for grinding the teeth thereof, said support being tiltable for raising the wheel, cooperating means on the support and base plate for maintaining the shaft and wheel in a horizontal path during a predetermined angular movement of oscillation of the wheel in either direction and for raising the wheel at the end of said path, a disk included in the support and provided with cam slots opening into each other at the inner ends thereof, a slide on the base plate, a roller on the slide and movable in either slot when the support is rocked for moving said slide longitudinally of the base plate and a catch on the slide engageable with the teeth of the saw for causing the base plate to be pulled along the saw the width of a tooth when said slide is moved in one direction, said catch moving idly over the teeth for engagement with a successive tooth on the saw when the slide is moved in the opposite direction by the oscillation of the wheel.

4. A saw sharpener comprising a base plate having a channel to receive the cutting edge of a saw, a grinding wheel, a horizontal driven shaft secured to the wheel, an oscillated support for the shaft mounted on the plate so that the wheel may be moved transversely of the saw for grinding the teeth thereof, cooperative means on the support and base plate for maintaining the shaft and wheel in a horizontal path in either direction of oscillation of the shaft and wheel, a disk included in the support and provided with cam slots opening into each other at the inner ends thereof, a slide on the base plate, a roller on the slide and movable in either slot when the support is rocked for moving said slide longitudinally of the base plate and a catch on the slide engageable with the teeth of the saw for causing the base plate to be pulled along the saw the width of a tooth when said slide is moved in one direction, said catch moving idly over the teeth for engagement with a successive tooth on the saw when the slide is moved in the opposite direction by the oscillation of the wheel.

5. A saw sharpener comprising a base plate having a channel to receive the cutting edge of a saw, a grinding wheel, a horizontal driven shaft secured to the wheel, an oscillated support for the shaft mounted on the plate so that the wheel may be moved transversely of the saw for grinding the teeth thereof, a disk included in the support and provided with cam slots opening into each other at the inner ends thereof, a slide on the base plate, a roller on the slide and movable in either slot when the support is rocked for moving said slide longitudinally of the base plate and a catch on the slide engageable with the teeth of the saw for causing the base plate to be pulled along the saw the width of a tooth when said slide is moved in one direction, said catch moving idly over the teeth for engagement with a successive tooth on the saw when the slide is moved in the opposite direction by the oscillation of the wheel, a second slide carrying the first slide on the base plate and means for adjusting the positions of the slides relative to each other for properly positioning the catch on the teeth of the saw.

CHARLES G. WAHLSTROM.

REFERENCES CITED

The following references are of record in the file of this patent:

UNITED STATES PATENTS

| Number | Name | Date |
| --- | --- | --- |
| 175,594 | Densmore | Apr. 4, 1876 |
| 261,624 | Olney | July 25, 1882 |
| 348,168 | Lynch et al. | Aug. 24, 1886 |
| 626,451 | Alden et al. | June 6, 1899 |
| 1,146,705 | Henry | July 13, 1915 |
| 1,557,494 | Glang | Oct. 13, 1925 |
| 1,780,886 | Pribnow et al. | Nov. 4, 1930 |
| 1,852,518 | Harrison | Apr. 5, 1932 |
| 1,874,315 | Laurent | Aug. 30, 1932 |

FOREIGN PATENTS

| Number | Country | Date |
| --- | --- | --- |
| 672,577 | Germany | Mar. 4, 1939 |